United States Patent
Devinck et al.

(10) Patent No.: US 10,693,924 B2
(45) Date of Patent: Jun. 23, 2020

(54) METHOD AND SYSTEM FOR CONNECTING ELECTRONIC DEVICES

(71) Applicant: BARCO N.V., Kortrijk (BE)

(72) Inventors: Wouter Devinck, Kortrijk (BE); Hsing Yung Wang, Taoyuan (TW); Johan Pirot, Redwood City, CA (US); Wenho Chen, Taipei (TW); Meng-Chung Hung, Tainan (TW); Saurabh Jain, Saratoga, CA (US); Rahul Pratap Kale, Milpitas, CA (US)

(73) Assignee: BARCO N.V., Kortrijk (BE)

( * ) Notice: Subject to any disclaimer, the term of this patent is extended or adjusted under 35 U.S.C. 154(b) by 368 days.

(21) Appl. No.: 15/261,045

(22) Filed: Sep. 9, 2016

(65) Prior Publication Data

US 2017/0078341 A1 Mar. 16, 2017

Related U.S. Application Data

(60) Provisional application No. 62/217,172, filed on Sep. 11, 2015.

(51) Int. Cl.
*H04L 29/06* (2006.01)
*H04W 4/80* (2018.01)
(Continued)

(52) U.S. Cl.
CPC ........ *H04L 65/403* (2013.01); *H04L 12/1818* (2013.01); *H04L 65/1069* (2013.01);
(Continued)

(58) Field of Classification Search
CPC ............... H04L 65/403; H04L 12/1818; H04L 65/4038; H04L 12/1827; H04L 65/1093;
(Continued)

(56) References Cited

U.S. PATENT DOCUMENTS 9,167,316 B2 10/2015 Nocera
9,387,813 B1 7/2016 Moeller et al.
(Continued)

FOREIGN PATENT DOCUMENTS

EP 1562323 8/2005
JP 2004-147256 5/2004

OTHER PUBLICATIONS

International Search Report (ISR) dated Dec. 16, 2016, for PCT/EP2016/071300.
(Continued)

*Primary Examiner* — Djenane M Bayard
(74) *Attorney, Agent, or Firm* — Bacon & Thomas, PLLC

(57) ABSTRACT

A method and system for conducting meetings, e.g. making it easy for the user to connect his device to the meeting or come to a common shared view of the meeting content, where all devices participating in the meeting are located within one physical meeting room. In another embodiment, at least some devices are located outside the meeting room. In principle there is no meeting room necessary, but all devices can be distributed anywhere in a region or in the world, and after connection, the meeting content is shared to all physical meeting rooms and remote devices of the system.

25 Claims, 11 Drawing Sheets

(51) Int. Cl.
*H04L 12/18* (2006.01)
*H04W 76/14* (2018.01)
*H04W 76/11* (2018.01)
*H04L 29/08* (2006.01)

(52) U.S. Cl.
CPC .............. *H04W 4/80* (2018.02); *H04W 76/11* (2018.02); *H04W 76/14* (2018.02); *H04L 67/02* (2013.01)

(58) Field of Classification Search
CPC ............. H04L 12/1822; H04L 12/1831; H04L 65/1069; H04L 67/10; H04L 12/1813; H04L 65/1089; H04L 65/605; H04L 67/42; H04L 12/1836; H04L 51/04; H04L 65/80; H04L 67/02; H04L 67/18; H04L 67/306; H04L 67/32; H04L 69/329; H04L 12/18; H04L 12/1877; H04L 12/1895; H04L 12/4625; H04L 2463/144; H04L 43/08; H04L 45/306; H04L 47/15; H04L 47/2416; H04L 47/70; H04L 49/901; H04L 49/9094; H04L 51/00; H04L 51/043; H04L 51/10; H04L 51/14; H04L 51/16; H04L 51/18; H04L 51/20; H04L 51/22; H04L 51/32; H04L 63/0442; H04L 63/08; H04L 63/102; H04L 63/14; H04L 63/1425; H04L 63/1458; H04L 63/1466; H04L 63/16; H04L 63/168
See application file for complete search history.

(56) References Cited

U.S. PATENT DOCUMENTS

| | | | | |
|---|---|---|---|---|
| 9,706,055 | B1* | 7/2017 | Alothman | ............... H04M 3/53 |
| 9,924,136 | B1* | 3/2018 | Faulkner | ................. H04N 7/15 |
| 2002/0191623 | A1 | 12/2002 | Couturier et al. | |
| 2004/0098531 | A1* | 5/2004 | Hagg | ................ H04L 12/40097 710/315 |
| 2004/0143829 | A1 | 7/2004 | Uchiumi et al. | |
| 2005/0018686 | A1 | 1/2005 | Igarashi et al. | |
| 2005/0185600 | A1* | 8/2005 | Nicholls | ................ G06Q 10/10 370/260 |
| 2007/0005795 | A1* | 1/2007 | Gonzalez | ............... G11B 27/10 709/232 |
| 2007/0005804 | A1* | 1/2007 | Rideout | .............. H04L 12/1822 709/246 |
| 2010/0041334 | A1* | 2/2010 | Engelsma | ............. G01S 5/0072 455/41.2 |
| 2014/0149554 | A1 | 5/2014 | Krishna et al. | |
| 2015/0121466 | A1* | 4/2015 | Brands | .................... H04L 63/08 726/4 |
| 2015/0141005 | A1 | 5/2015 | Suryavanshi et al. | |
| 2015/0381934 | A1* | 12/2015 | Kondo | ................... H04N 7/152 348/14.09 |
| 2016/0285928 | A1* | 9/2016 | Sanso | ................... H04L 65/403 |
| 2018/0323988 | A1* | 11/2018 | Beel | ......................... H04N 7/15 |

OTHER PUBLICATIONS

Written Opinion dated Dec. 16, 2016, for PCT/EP2016/071300, May 21, 2018.

U.S. Office Action in related U.S. Appl. No. 15/757,823, dated Jun. 28, 2019.

European Office Action in related European Application No. 16774461.4-1216, dated Mar. 7, 2019.

European Office Action in related European Application No. 1677446141216, dated Jan. 2, 2020.

U.S. Office Action in related U.S. Appl. No. 15/757,823, dated Dec. 19, 2019.

* cited by examiner

Each base unit is providing the at least one shared data stream to its at least one meeting device, over a local network. —102
Figure 11
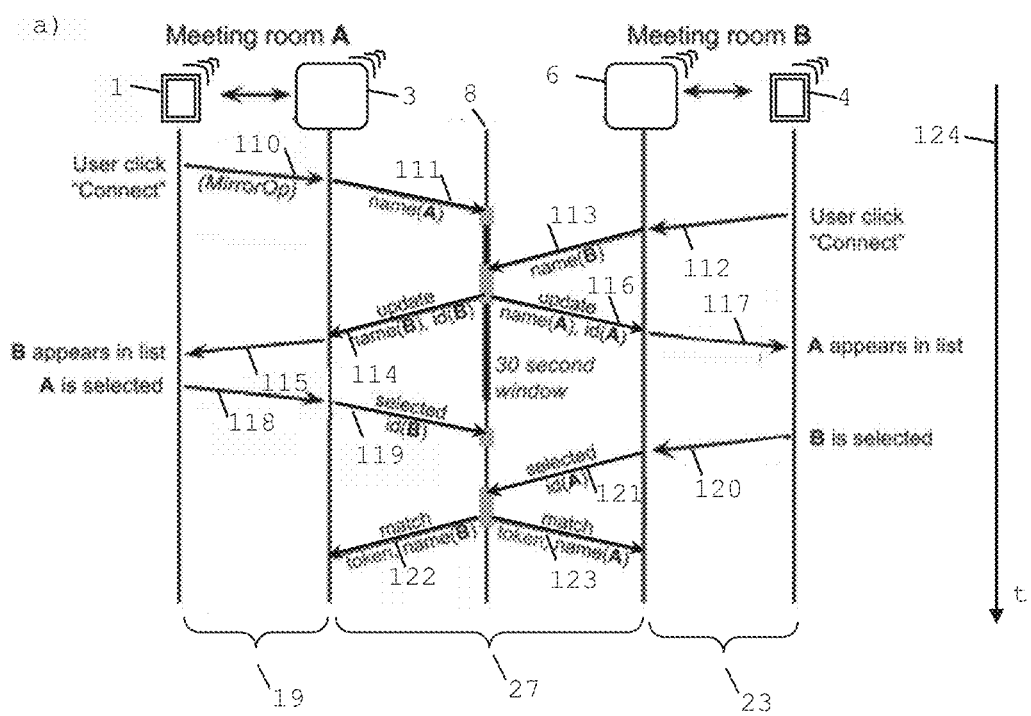
Figure 12A
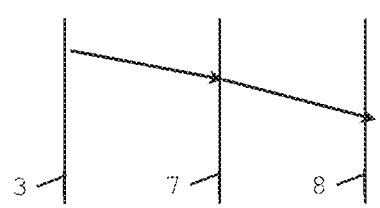
Figure 12B

METHOD AND SYSTEM FOR CONNECTING ELECTRONIC DEVICES

CROSS REFERENCE TO RELATED APPLICATIONS

This application claims benefit of U.S. provisional 62/217,172, filed Sep. 11, 2015, the entirety of which being incorporated herein by reference.

FIELD OF THE INVENTION

The present invention relates to methods and systems for connecting electronic devices that can run on different platforms and being distributed in different physical meeting rooms, so that they can share data streams as well as software to implement such methods.

BACKGROUND

There is an increased interest in how to set up meetings involving devices that run on different types of platforms and/or use different protocols, e.g. the same meeting could comprise a participants having laptop, a mobile device and/or a tablet and these may use different operating systems, browsers, emailing systems, audio and/or video codecs etc. In a further step it is desirable if these devices can be located in different meeting rooms but still connect to the same meeting and be able to share meeting content, such as e.g. video and application content, with all participants in the meeting. Another focus point in the field of meeting and collaboration is to improve the user experience, e.g. come to a common shared view of the meeting content or making it easy and more intuitive for the user to connect to the meeting.

SUMMARY OF THE INVENTION

It is the objective of the present invention to provide a good method and system for conducting meetings, e.g. making it easy for the user to connect his device to the meeting or come to a common shared view of the meeting content. In one embodiment of the present invention, all devices participating in the meeting are located within one physical meeting room. In another embodiment of the present invention, at least some devices are located outside the meeting room. In principle there is no meeting room necessary, but all devices can be distributed anywhere in a region or in the world, and after connection, the meeting content is shared to all physical meeting rooms and remote devices of the system.

In one aspect of the present invention a method for sharing data streams between meeting devices in a meeting is provided in which the following are participating:
  at least two meeting devices adapted for electronic digital communication,
  at least two base units,
  at least one server,
  at least three communication networks,
the method comprising the steps of
  the at least two meeting devices each connecting for electronic digital communication to a different base unit over at least two different networks,
  at least one meeting device initiating the creation of a meeting identifier,
  each meeting identifier being shared, over a third network, with the at least two base units belonging to a meeting associated with the meeting identifier,
  at least one of the at least two meeting devices sending at least one data stream to a first base unit with which it is connected, over one of the at least three communication networks or within the at least one meeting device, and
  the first base unit and the at least one server exchanging set-up messages associated with the meeting identifier and the at least one data stream, via a bus.

The provision of a bus for carrying the set-up messages and not the data stream has the advantage that the bus is not overloaded with data. Each base station in one meeting shares the same meeting identifier. Base stations in different physical rooms can be connected. Using the bus makes the system scalable.

The at least two base units can be located in different rooms or different buildings or different countries or different continents, or in any combination thereof. This has the advantage that the same system can be used for local or global meetings. For example, the set-up messages from the at least two base units can be posted to a bus queue. Using a bus queue makes the system highly scalable. Thus the number of base units can be extended up to 500, 1000 or several thousands.

The at least one server can comprise a media service and a control service, and the control service can be adapted to instruct the media service how to manipulate the at least one data stream. This allows a control function to be executed efficiently. The modular structure also makes the control and media services available for any application.

The media service can comprise a method to combine a plurality of data streams into a single data stream based on instructions from the control service. This allows the data streams to be executed efficiently.

A set of instructions can be natively executed by a web browser.

Initiating the creation of a meeting identifier can comprise the following steps
  a first meeting device sending an initiation signal to the first base unit, the first base unit sending the signal to the at least one server via the bus, the signal arriving at the at least one server at a first time (t1),
  a second meeting device sending an initiation signal to a second base unit, the second base unit sending the signal to the at least one server via the bus, the signal arriving at the at least one server at a second time (t2), and if the difference between the second and first time (t2−t1) is less than or equal to a predefined value, the at least one server sends out notifications of the first and second meeting devices to the second and first meeting devices, respectively, the first and second meeting devices selecting the second and first meeting device, respectively, and when the selections are received by the at least one server, the at least one server is creating a meeting identifier.

This allows a degree of security as only a request that arrives within a time window will be accepted.

Sending an initiation signal can comprise a user action selected from changing orientation of the meeting device or shaking the meeting device or pushing a physical or virtual knob or button associated with the meeting device. Such a user action is easy and quick to perform.

Alternatively, initiating the creation of a meeting identifier can comprises the following steps a first meeting device sending an initiation signal to the first base unit when a first button is pressed, the first base unit sending the signal to the at least one server via the bus, a second meeting device sending an initiation signal to a second base unit when a second button is pressed while the first button is still being pressed, the second base unit sending the signal to the at least one server via the bus, the at least one server sending out notifications of the first and second meeting devices to the second and first meeting devices, respectively, the first and second meeting devices selecting the second and first meeting devices, respectively, and when the selections are received by the at least one server, the at least one server creating a meeting identifier.

This allows a degree of security as only a request that arrives while both buttons are depressed will be accepted.

An external communication channel can be used for ambient audio signals associated with the at least two meeting devices and the ambient audio signals from each of meeting device location can be sent along with the initiation signal to the at least one server from the first and second base units and via the external communication channel, if the audio signals from the first and second base units that travelled via the external communication channel match with the audio signals sent directly by the first and second base units, the at least one server creating a meeting identifier for matching signals.

This allows a degree of security as only request that has matching audio signals will be accepted.

One of the at least two meeting devices and at least one of the two base units can be integrated into one device. This is advantageous for remote participants of a meeting, e.g. in a hotel where no base unit exists.

The at least one server can use audio signals to uniquely pair initiation signals and create the meeting identifier. Audio signals can be used as a fingerprint of a location thus increasing security. The audio signal may comprise ambient sound at the locations of the respective meeting devices as this does not require user intervention.

Initiating the creation of a meeting identifier can comprises the following steps a first meeting device sending an initiation signal to the first base unit by entering a pre-defined token, the first base unit sending the token to the at least one server via the bus, a second meeting device sending an initiation signal to a second base unit by entering the above pre-defined token, the second base unit sending the token to the at least one server via the bus, the at least one application server defining the predefined token as the meeting identifier.

This allows a degree of security as a request will only be accepted if the tokens from two different devices match.

Initiating the creation of a meeting identifier comprises the following steps a first meeting device sending a request to the at least one server, via the first base unit and the bus, to list active or pending meetings, if there are meetings associated with the first meeting device, the at least one server sending back a list of meetings to the first meeting device a second meeting device sending a request to the at least one server, via a second base unit and the bus, to list active or pending meetings, if there are meetings associated with the second meeting device, the at least one server sending back a list of meetings to the second meeting device selecting a meeting by associated users and the first and second meeting devices sending the selections to the at least one server via the first and second base units and the bus and when the selections are matching each other and are received by the at least one server, the at least one server is creating a meeting identifier.

This allows a degree of security as a matching of requests is required from two different devices.

The list of pending meetings is preferably created locally on the first and second meeting devices via a local calendar application. This allows an easy implementation.

The system can comprise a means for short distance communication, and one of the at least two meeting devices is being placed within range of the means for short distance communication technology of at least one base unit, the at least one base unit preferably transmitting continuously a signal comprising network information, the one of the at least two meeting devices picking up the signal transmitted by a nearest base unit, and using the network information to connect with the nearest base unit.

Short distance communication helps to reduce the risk of eavesdropping. Further connection information can be exchanged over the means for short distance communication, the one of the at least two meeting devices and the base unit using said connection information to connect. Further connection information can be useful, e.g. when the signal is only transmitted intermittently. Also more information can be broadcasted, e.g. multiple options.

The nearest base unit can be found by using signal strength and/or triangulation between base units. These are methods that are easy to implement.

The nearest base unit can also be found by using signal strength and/or triangulation between signals from base units and signals from meeting devices already paired with the base unit. Using more devices increases the accuracy of location.

The short distance communication can be implemented using Bluetooth or Bluetooth Low Energy or Near Field Communication. This is easy to implement as Bluetooth is well documented and standardised.

Each base unit can be providing a shared stream to its at least one meeting device.

A base unit can communicate with the bus via secure websockets. This can works without additional configuration on many or most corporate networks.

A meeting device can be a laptop or a tablet or a mobile phone or a smartphone or a palm pad or a stationary computer. Making a wide range of devices available allows for a quick introduction to the market.

A base unit can be a collaboration platform communicating with meeting devices over the first network and communicating with the at least one server, using the bus, over the second network. Separating the bus from the data network means that the bus is less likely to be blocked. Different technologies can be used for the first and second networks, e.g. one of the wireless standards for the local network.

In another aspect the present invention provides a system for sharing data streams between meeting devices, the system comprising at least two meeting devices, at least two base units, at least one server, a bus, hosted by the at least one server, a meeting identifier, at least two local networks separated from a global network, the at least two meeting devices being each connected to a different base unit over the at least one local network, the at least two base units being connected to the bus over the global network and, wherein base units belonging to the same meeting share one meeting identifier.

The global network can be a wide area network, and wherein the at least two base units being located on the local area network and a control service and a media service are located in the wide area network.

The media service can be located on the local area network while the control service is located in the wide area network.

The at least two meeting devices can be located in different rooms or different buildings or different countries or different continents, or in any combination thereof.

A system according to any of the disclosed inventions, wherein set-up messages from the at least two base units to the at least one server are posted to a bus queue. The bus queue makes the system scalable up to thousands of base units.

The at least one server comprises a media service and a control service.

One of the at least two meeting devices can include an accelerometer.

A base unit can be connected to, or include an input device, for example a physical button or an emulated button.

The meeting identifier preferably comprises meeting device identification or parameters of a meeting, such as start time, stop time, duration, participants, location, content, or any combination thereof.

A meeting device and/or a base unit can have means for short distance communication, for example Bluetooth or Bluetooth Low Energy or Near Field Communication.

The system may make used of secure websockets.

A meeting device can be a laptop or a tablet or a mobile phone or a smartphone or a palm pad or a stationary computer.

A base unit can be a collaboration platform communicating with meeting devices over a first network and communicating with the at least one server, using the bus, over a second network.

The base unit can be implemented as a computer program product comprising a machine-readable medium carrying instructions which, when executed by a processor, cause the processor to perform any of the methods of the present invention, e.g. as defined in any of the method claims.

The computer program product can be implemented in a meeting device.

The computer program product can be implemented as a set of instructions that can natively be executed by a web browser.

BRIEF DESCRIPTION OF THE DRAWINGS

FIG. 11 illustrates a time diagram of an embodiment of the present invention where a base unit shares the data stream to all its meeting devices.

FIG. 12A and FIG. 12B illustrate a time diagram of an embodiment of the present invention.

DETAILED DESCRIPTION OF THE INVENTION

Figure 1:
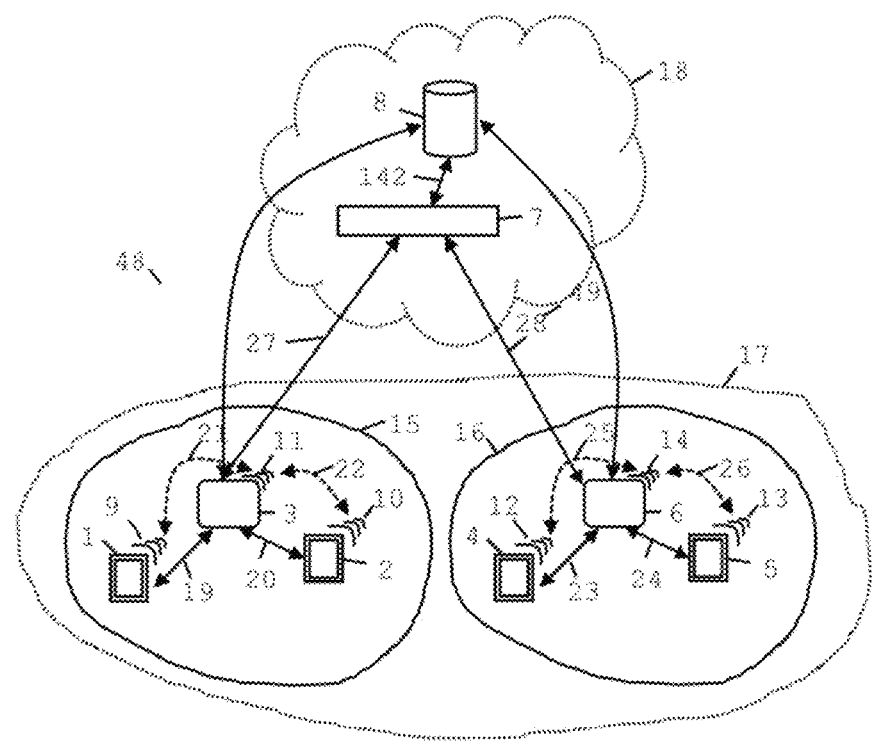
FIG. 1 illustrates an embodiment of the present invention where meeting devices in different physical rooms are connected to the same meeting.

"Cloud" and "cloud" computing:

Provides scalability, e.g. cloud computing servers can be quickly configured to process data.

By connecting cloud service providers together, e.g. to the Internet via multiple tier 1 backbones fast response times can be obtained as well as fault tolerance.

The end user or IT professional can access online, activate and use applications and services from start to finish without involving a provider to set up an account.

SaaS—Software as a Service—providers can deliver an entire application to an end user, relieving the organization of all hardware and software maintenance. Applications running from a Web browser use this model, including Web-based e-mail and data stored in the cloud.

IaaS/PaaS—Infrastructure/Platform as a Service—also called "cloud hosting" and "utility computing," provides an infrastructure as a service (IaaS), e.g. servers and operating systems, while platform as a service (PaaS) adds databases, runtime engines and other necessary system software for a customer to deploy its applications.

Instead of purchasing and operating one's own servers, it can be more economical for a user to use the cloud for computing and eliminate the security, maintenance, network and environmental issues with in-house data centers.

The cloud can employ server virtualization, which, among other benefits, allows application workloads to be easily added and removed as self-contained modules.

Private and Hybrid Clouds can be created by users. Private clouds can be implemented in datacenters controlled totally by a user which employ the same cloud computing infrastructure used on the Internet. The private cloud provides the same flexibility and self-service capabilities, but with complete control of privacy.

A hybrid cloud is both private and public. If the private cloud is overloaded, applications are activated on the Internet cloud. Software and databases can be extended from internal servers to a cloud providers' servers and both venues can be managed from a central console.

A "meeting" is hereafter referred to as a collection of devices having means for electronic digital communication such as at least one transceiver that can share some content or the same content with each other in real time and within an interval perceived as the same point of time for a human being.

A "meeting device" is a device having means for electronic digital communication such as at least one transceiver and usually will have a means of display such as a computer or mobile phone screen and a means for data entry such as a keyboard. Such a device can be, for example a laptop, a mobile phone or smartphone, a tablet, a palm pad, a stationary computer, a networked display or any other electronic device suitable for managing information. The meeting device can comprise a processor.

A "base unit" is a transferring unit or meeting node or platform that can be used in a scalable system where base units in different physical meeting rooms can be connected with each other. A base unit can be connected to at least one meeting device and/or to at least one display in the physical meeting room. A base unit can be a physical box or it can be implemented as a computer program product directly in a meeting device or as a cloud service. A base unit and a meeting device may be integrated into one device. In any of the embodiments of the present invention the term base unit may be exchanged with "transfer unit". The transfer unit may be any of a base station, a router, a modem etc.

A "beacon" is device designed to attract attention to itself and/or its capabilities by means of sending signals that can be read and parsed by any suitable transceiver within range. A beacon can broadcast such signals. A beacon signal will be transmitted from a transmitter. Beacons can be low power transmitters that, unlike full communication with a base unit or station, do not need to carry traffic data. For example, pilot signals can operate as beacons, such pilots only transmitting in the pilot channel of a wireless telecommunication system.

In any of the embodiments of the present invention it is specifically disclosed by this paragraph that that a beacon can be a means for short distance communication, for example Bluetooth, Bluetooth Low energy or Near Field Communication. The advantage of using short range beacons is that it reduces the risk that a meeting device can be used to log onto a base unit from a location outside the range that is desired. Thus short range communications help to avoid eavesdropping.

A "server" can be a physical computing machine comprising e.g. a central processing unit, graphics processing unit, memory, etc. or similar services provided in the cloud. Hence, the server can be located on certain premises or on the public internet, or "in the cloud", being able to provide one or several cloud services.

An "instance" is a virtual computing machine that emulates the functions of a physical server. One physical server can host a multiple of instances of virtual machines.

A "service" can be any function provided by the at least one server or instance.

An "application server" is a server or an instance that can be located in the cloud. It can host various functions related to applications. These functions are referred to as "application services".

A "media server" is a server or an instance that can be located in the cloud. It can host functions for manipulating data streams such as e.g. composition or transcoding. These functions can be referred to as "media services".

A "control server" is a server or an instance that can be located in the cloud. It can host functions that can control other services. It can for example decide which service will work on the data stream and where this will take place.

A "set-up message" comprises information for setting up what should happen with a data stream and at which device or devices.

A "remote client" can comprise e.g. web clients and stand-alone mobile application software.

A "bus" is a medium that can enable "clients" that are connected to it, to communicate with each other, either through a queueing mechanism or directly. Clients of the bus can include, but are not limited to, base units, application servers, media servers, control servers and remote clients. A queueing mechanism can be used by the bus to provide scalability to the system where required, e.g. when many clients are using many application servers, i.e. subscribers. A subscriber could be e.g. control servers (or services) or application servers (or services). A bus is a shared data highway that connects different parts of the system and allows transfer of information whereby the connection does not have to be by wires either partly or completely. Every device which is connected to the bus monitors activity on the bus and can receive messages directed to it. A bus is preferably built as a fast means of 'message passing' with needs such as queueing/authentication etc. of messages On the other hand data streams are binary streams of continuous data and as such are not suited for transport through a bus. As such the 'bus' is used typically for 'control' related messages while data is sent between the endpoints directly. Preferably only one bus (possibly with multiple of instances) is present in a system. A bus is preferably to be a central point of interconnectivity between all the elements of the system. Any use of the term "bus" in the description and claims of the present invention can be replaced with the term "service bus".

A "meeting identifier" is a token that is unique for each meeting.

A "local network" can be a Local Area Network (LAN), e.g. a company network, or a Virtual Private Network within a LAN or any network that has a limited extent and a defined number of users who can access it. It will typically have shared resources.

A "global network" can be the public internet that extends across the globe and is accessible for anyone. It can also be a private leased line on a network that can span over large distances.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Embodiments of the present invention will now be described with reference to FIGS. 1-15.

FIG. 1 shows an embodiment of the present invention where two meeting devices 1 and 2 are located near a base unit 3 in a physical room 15. Also meeting devices 4 and 5 are located near a base unit 6 in physical meeting room 16. The meeting devices 1 and 2 and base unit 3 can transfer data streams and optionally signalling information over a local network; 19 and 20 are branches of this local network. The meeting devices 1 and 2 have beacons 9 and 10, respectively, and can exchange information with the base unit 3 which has a beacon 11. However, the actual data streams and optionally signalling information are sent over the local network, e.g. via 19 or 20. The meeting devices 4 and 5 can, mutatis mutandis, exchange data streams over a local network comprising branches 23 and 24, as well as exchange network and device information with their base unit 6 using beacons 12, 13 and 14. The information exchange 21 or 22 (25 or 26) comprises information on the network and device identifications that can be used for pairing the meeting devices 1 and 2 (3 and 4) to the base unit 3 (6).

The two physical meeting rooms 15 and 16 can be located in different parts of a building, and/or in different countries, and/or on different continents. However, the present invention enables them to participate in a common meeting 17. In accordance with an embodiment of the present invention, the base units 3 and 6 communicate with cloud services 18 via a global network, e.g. the public internet. The base units can communicate with a bus 7 which manages the communication of set-up messages between them and the application servers, e.g. via routes 27 and 28. The application services are implemented on an application server 8, located somewhere in "the cloud" 18, which can either be a public cloud or a private cloud. The data streams are managed by the media services and are not communicated via the bus, but e.g. directly over the network via routes 48 and 49. One feature of the present invention is that the local networks around each base station are separated from the global network, for example the public internet. The meeting devices associated with a base unit communicate with their respective base unit. The base units 3 and 6 report their capabilities, e.g. how to perform composition or handle multiple resources, to a control service (e.g. 130 in FIG. 15). The control service can continuously decide what will happen on which base unit and which media server. If a base unit cannot do composition, or when it is more optimal to do composition in the cloud, the control service can decide to have the composition performed on a media server in the cloud (e.g. 140 in FIG. 15). The media server in the cloud can also optionally perform transcoding (e.g. from h.264 to VP8) and dynamic repackaging (e.g. to WebRTC) if the control services deems it necessary.

Figure 2:
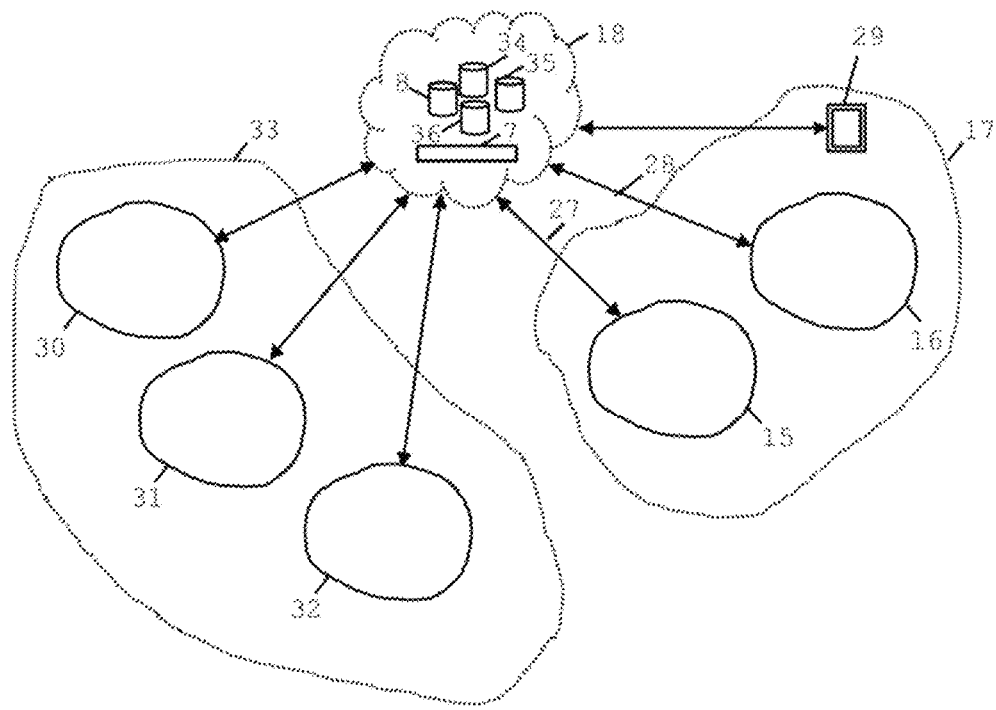
FIG. 2 illustrates an embodiment of the present invention where a system comprises several meeting rooms and several application servers and also a remote meeting device.
Figure 13:
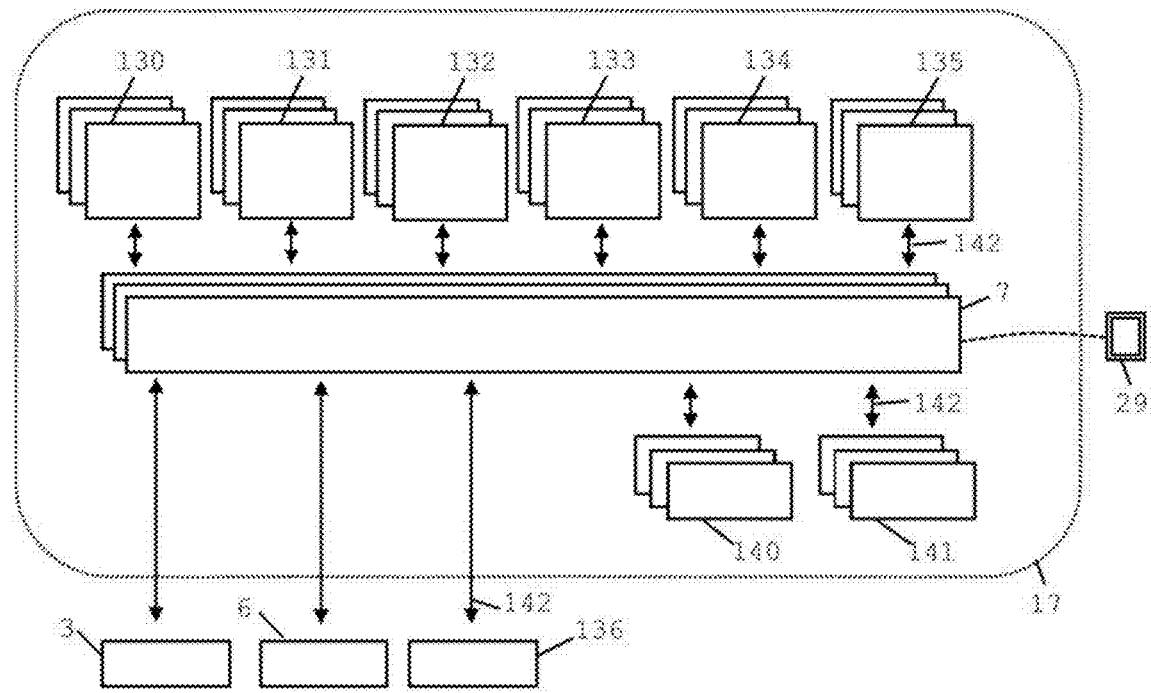
FIG. 13 illustrates schematic an embodiment of the present invention comprising several instances of the cloud servers.

FIG. 2 shows another embodiment of the present invention where the system has been scaled up. Apart from the meeting rooms 15 and 16, participating in meeting 17, there are also physical meeting rooms 30, 31 and 32, participating in a meeting 33. Apart from application server 8 there are also application servers 34, 35 and 36 to host the application services. There is, however, still one bus 7. The bus 7 and the application services can, however, have several instances, as shown in FIG. 13. Meeting device 29 comprises a computer program product that performs the functions of a physical base unit, such as e.g. 3 or 6. In this way the meeting device 29 can connect to the meeting without being connected to a physical base unit. The computer program product can for example be a smart device application software or a web client. Meeting device 29 can thus participate in meeting 17 being located in a room, other than 15 or 16, that does not have a base unit.

Figure 3:
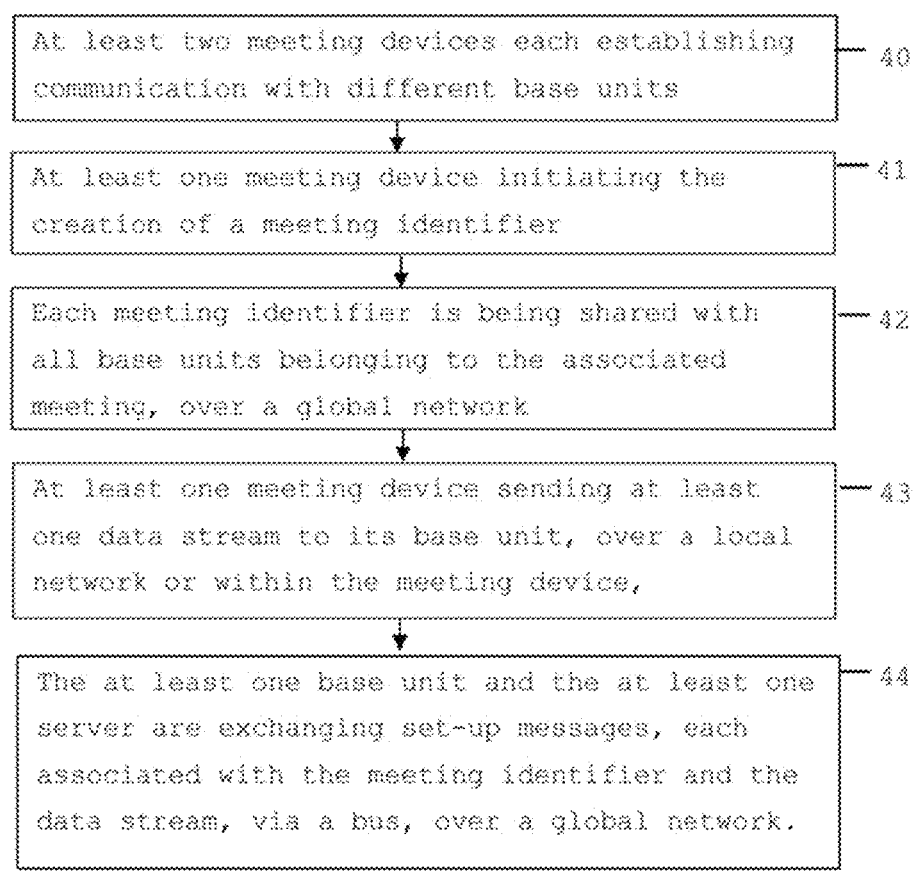
FIG. 3 shows a flow chart of an embodiment of the present invention where meeting devices in different physical rooms are being connected to the same meeting.

FIG. 3 shows a flow chart describing an embodiment of the present invention where a meeting is set up and a data stream is shared with all base units in the meeting. For illustrative purposes, consider meeting devices 1 and 4 of FIG. 1, located in separate rooms 15 and 16, before they have joined the meeting 17. In step 40, at least two meeting devices, e.g. 1 and 4, are each establishing contact with a different base unit, e.g. 3 and 6 respectively. The connection takes place, for example, over a local network, e.g. 19 and 20. In step 41, at least one or some or all of the meeting devices initiates the creation of a meeting identifier. If meeting devices 1 and 4 are participating in one meeting 17, there will be one meeting identifier shared between base units 3 and 6. Step 41 can be implemented in various ways which is further elaborated on in FIGS. 5 to 8. In step 42, the meeting identifier is shared with all base units in the meeting, e.g. 3 and 6 of meeting 17. This can be done via a suitable network such as a global network.

A meeting device can simultaneously share at least one data stream to the meeting. If, for example, a meeting device shares a real time video (e.g. for a conference call) together with the content of an application, there will be two streams shared. A meeting device can send the data streams to be shared to the base unit it is paired with. The base unit can handle streams from and to the meeting devices it is paired with, which can include for example transcoding and composition.

In Step 43 at least one meeting device sends at least one data stream to its base unit, over, for example, a local network. In step 44, the at least one base unit and the at least one server are exchanging set-up messages associated with the meeting identifier and with the data stream. The exchange of set-up messages takes place via a bus, in which there can be a queue implemented, and the bus provides the set-up messages to the appropriate subscribers. In embodiments of the present invention set-up messages are sent via the bus and not by other routes and data streams are not sent on the bus. The bus may be located in a global network. Such an appropriate subscriber can be a control server (hosting an executing control services) which can instruct a media server (hosting an executing media services) what to do with the data stream. The data streams are then sent and received to and from the media services. A media service can manipulate the data stream in various ways, e.g. perform composition, perform transcoding, or send the stream via a relay. Composition can e.g. comprise to design the layout for display of a multiple of data streams or windows, or to place data streams in already existing windows, etc. The composition is done by receiving and decoding the plurality of data streams and rendering the resulting images as modified by, and augmented with, instructions that can be natively executed in an HTML (Hyper Text Markup Language) browser. The resulting composition can be further encoded for network transmission. Transcoding is needed when meeting devices running on different platforms should participate in the same meeting, such as e.g. a laptop running on Windows and a mobile phone running on Android or to alter the quality depending on bandwidth, etc. In order to force the data stream to follow a specific path, it is sent to one or several relay(s). A meeting device can comprise a media service and there can also be a media service hosted by a media server "in the cloud".

Figure 4:
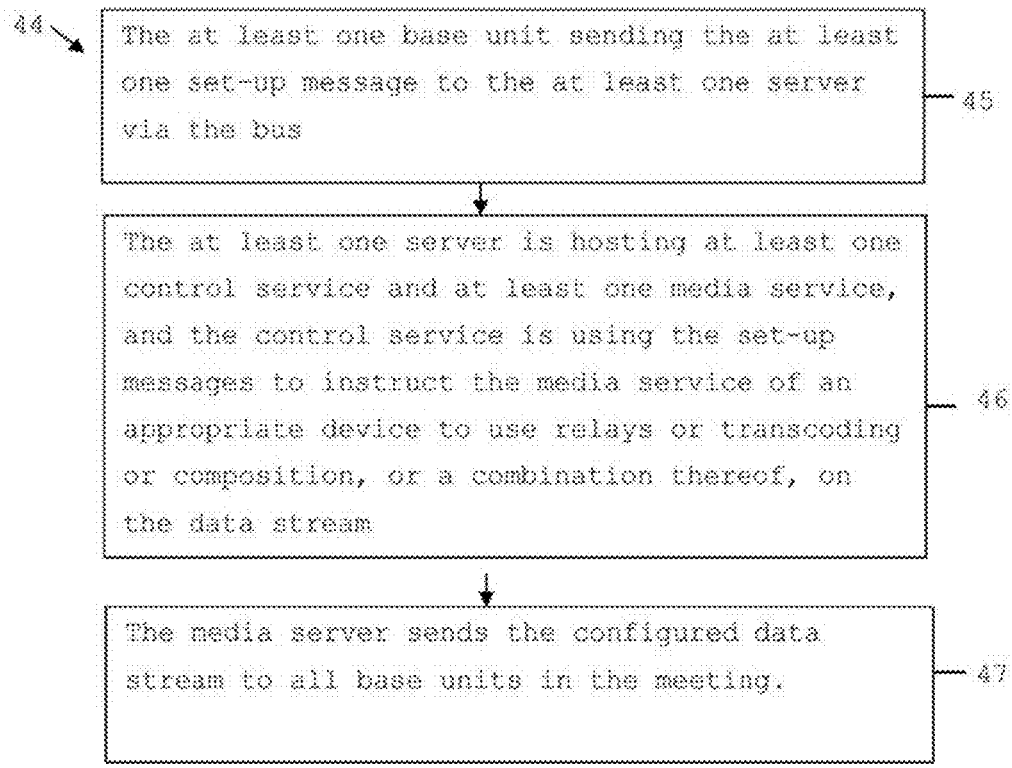
FIG. 4 shows a flow chart of an embodiment of the present invention further describing the communication with the bus.

FIG. 4 shows a flowchart of an embodiment of the present invention, where step 44 of FIG. 3 has been broken down into sub-steps. In step 45, the at least one base unit is sending the set-up messages to the at least one server via the bus. In embodiments of the present invention set-up messages are sent via the bus and not by other routes and data streams are not sent on the bus. In step 46, the at least one server is hosting at least one control service and at least one media service. The media and control service can optionally be running on different servers or on the same server.

The set-up message is giving instructions to the control service. The control service is instructing the media service of an appropriate device to use functions to be applied on the data stream, such as e.g. transmission via relays or transcoding or composition or any other function, or a combination thereof. The media service can be hosted by a server "in the cloud" or be implemented into a meeting device. It is the control server which decides where a certain function will be implemented. The decision can be based on e.g. device capabilities and/or available band width. The media server then sends the configured data stream to all base units in the meeting in step 47, e.g. directly over the network. When a base unit has received a data stream it can push it to at least one display connected to it. This can be a display located in a physical meeting room, or in case of a remote meeting device, it will be the display of the meeting device wherever that is located.

Figure 5:
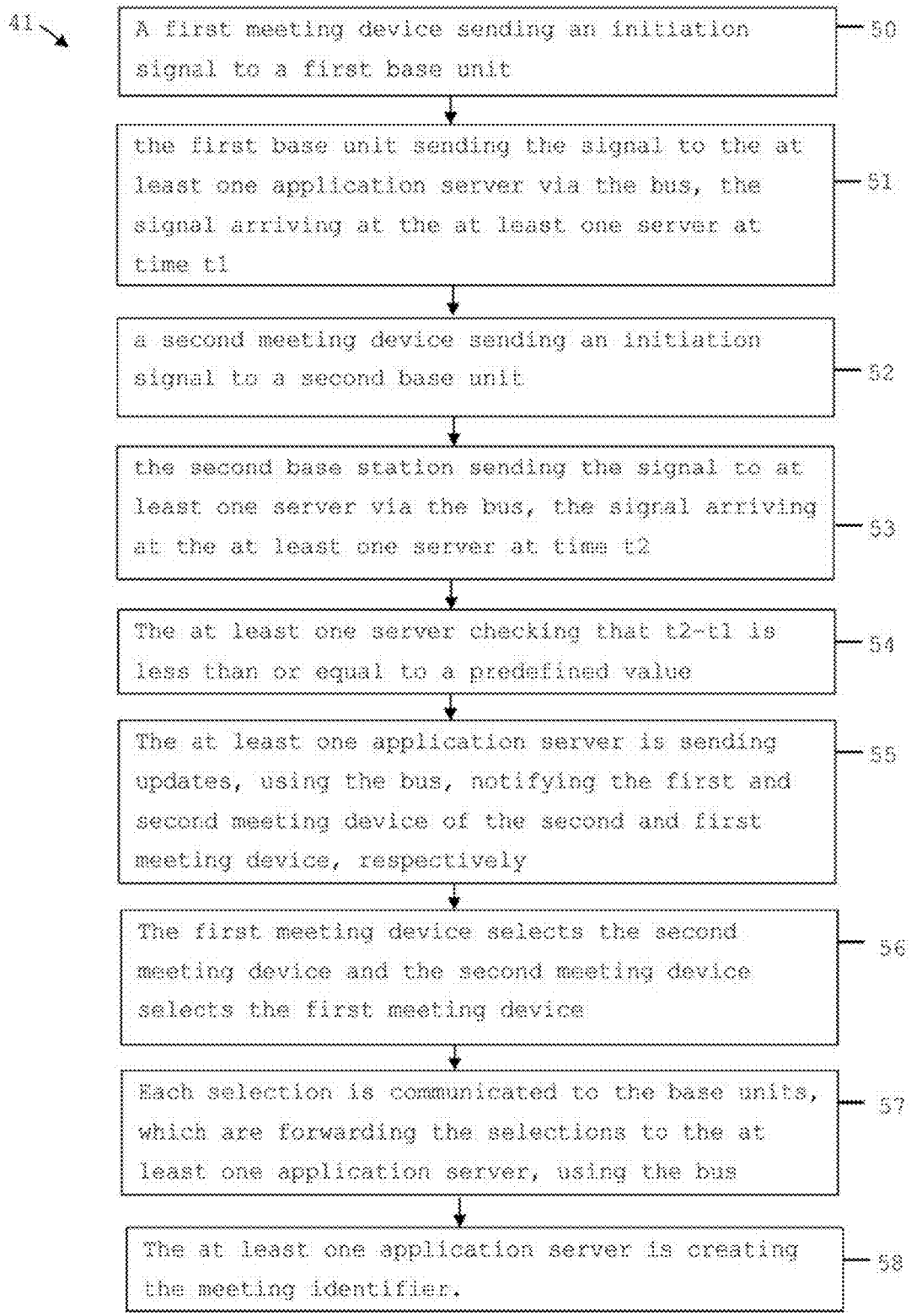
FIG. 5 shows a flow chart of an embodiment of the present invention where a meeting device initiates the creation of a meeting identifier.

FIG. 5 shows a flowchart of an embodiment of the present invention describing the initiation of creating the meeting identifier (see step 41 of FIG. 3). In step 50, a first meeting device, e.g. 1 sends an initiation signal to a first base unit, e.g. 3. The initiation signal can be created or initiated by any suitable user action such as for example changing the orientation of the meeting device, or shaking it and hereby making use of a built-in accelerometer which is activated by the shaking. Or it can comprise a user pushing a button associated with the meeting device or the base unit. The button can be a physical button or it can be a virtual button, e.g. appearing upon a display as an icon or image. In step 51, the first base unit is then sending the signal to the at least one server via the bus so that the signal arrives at the at least one application server at a first time t1. In step 52, a second meeting device is sending an initiation signal to a second base unit. In step 53, the second base unit is sending the signal to the at least one application server via the bus so that the signal arrives at the at least one application server at a second time t2. When defining time t1, a time window of pre-defined size is or can be started, for example 30 seconds. In step 54 the at least one server can check if t2−t1 is within the window, e.g. within a pre-defined value or within a range. In step 55, if the second initiation signal arrives within this window, the at least one application server will notify, i.e. send out an update and notification of the second meeting device to the first meeting device. This is done preferably simultaneously with sending out an update and notification of the first meeting device to the second meeting device. The notification may take place during or after the pre-defined time window. The signals will arrive at the respective base units via the bus. In step 56 each meeting device can now select the other, and in step 57 the selections are sent back to the respective base units who send the selections to the at least one application server via the bus. When both meeting devices are selected, the at least one application server creates the meeting identifier in step 58.

Figure 6:
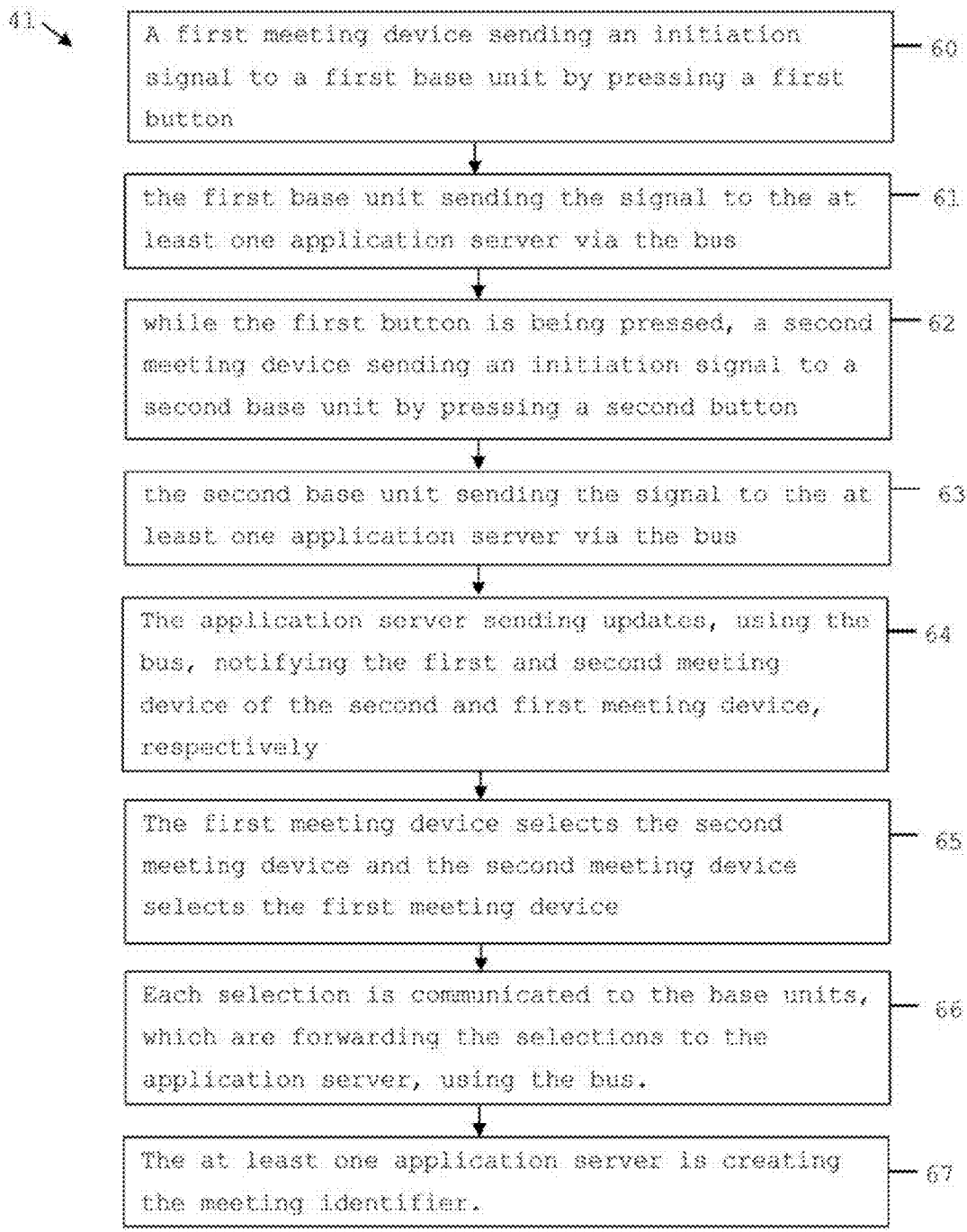
FIG. 6 shows a flow chart of an embodiment of the present invention where a meeting device initiates the creation of a meeting identifier.

FIG. 6 shows a flow chart of an alternative embodiment of the present invention where steps 50 to 54 of FIG. 5 are replaced with steps 60 to 64. The initiation of creating the meeting identifier comprises a user action (in step 60) such as the use of a button, for example. This can be a physical button or a virtualized button, e.g. an icon on a display or screen such as a touchscreen. In step 60 the first meeting device is sending an initiation signal to a first base unit by the user action such as a first button associated with the first base unit being pressed. In step 61, the first base unit is sending the signal to the at least one application server (hosting the application service) using the bus. In step 62, while the first button is still being pressed, a second meeting device sends an initiation signal to a second base unit by a second user action, such as a second button being pressed. In step 63, the second base unit sends the signal to the at least one application server (hosting the application service) using the bus. Steps 64 to 67 are then equal to the steps 55 to 58 of FIG. 5. A variation of this scheme is where the application server checks for a period of significant overlap to pair (or connect) the set of initiating devices.

A further variation of this scheme is where the two locations where the meeting devices are located are already connected over a separate audio connection and ambient audio samples are sent by each of the meeting devices as part of the initiating signals, which are then further used by the application server to arrive at the pairing of meeting devices.

Figure 7:
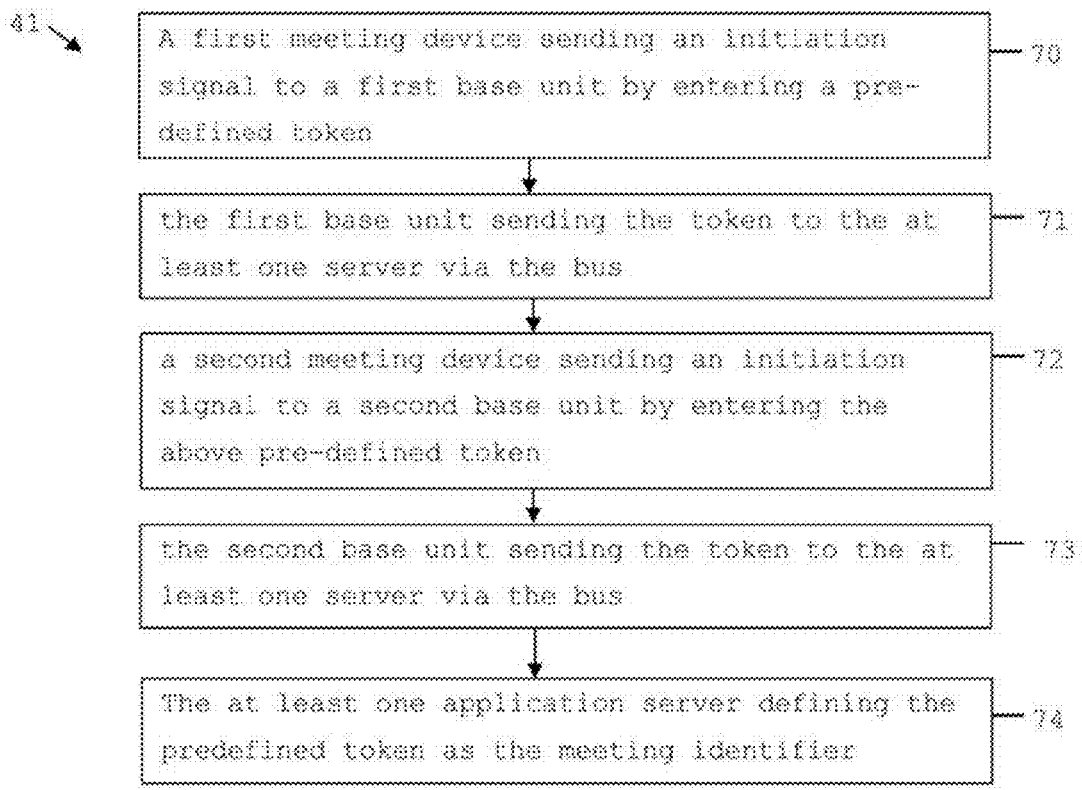
FIG. 7 shows a flow chart of an embodiment of the present invention where a meeting device initiates the creation of a meeting identifier.

FIG. 7 shows a flow chart of an alternative embodiment of the present invention where the initiation of creating the meeting identifier comprises exchanging a token agreed upon on beforehand by all meeting devices/meeting participants. The token can be represented e.g. by a meeting name or any other arbitrary word, jingle or alphanumeric sequence or any other token that preferably has a meaning related to the meeting. This can make it easier for the users to get connected. It can further facilitate integration with existing video conference systems, or the like, where users already have a worked-in procedure of entering tokens to connect. In step 70, a first meeting device is sending an initiation signal to the first base unit by entering a pre-defined token. In step 71, the first base unit is sending the token to the at least one application server, via the bus. In step 72, a second meeting device is sending an initiation signal to the second base unit by entering the above mentioned pre-defined token. In step 73, the second base unit is sending the token to the at least one application server, using the bus. Steps 74 to 77 are then equal to steps 55 to 58 of FIG. 5 or steps 64 to 67 of FIG. 6.

Figure 8:
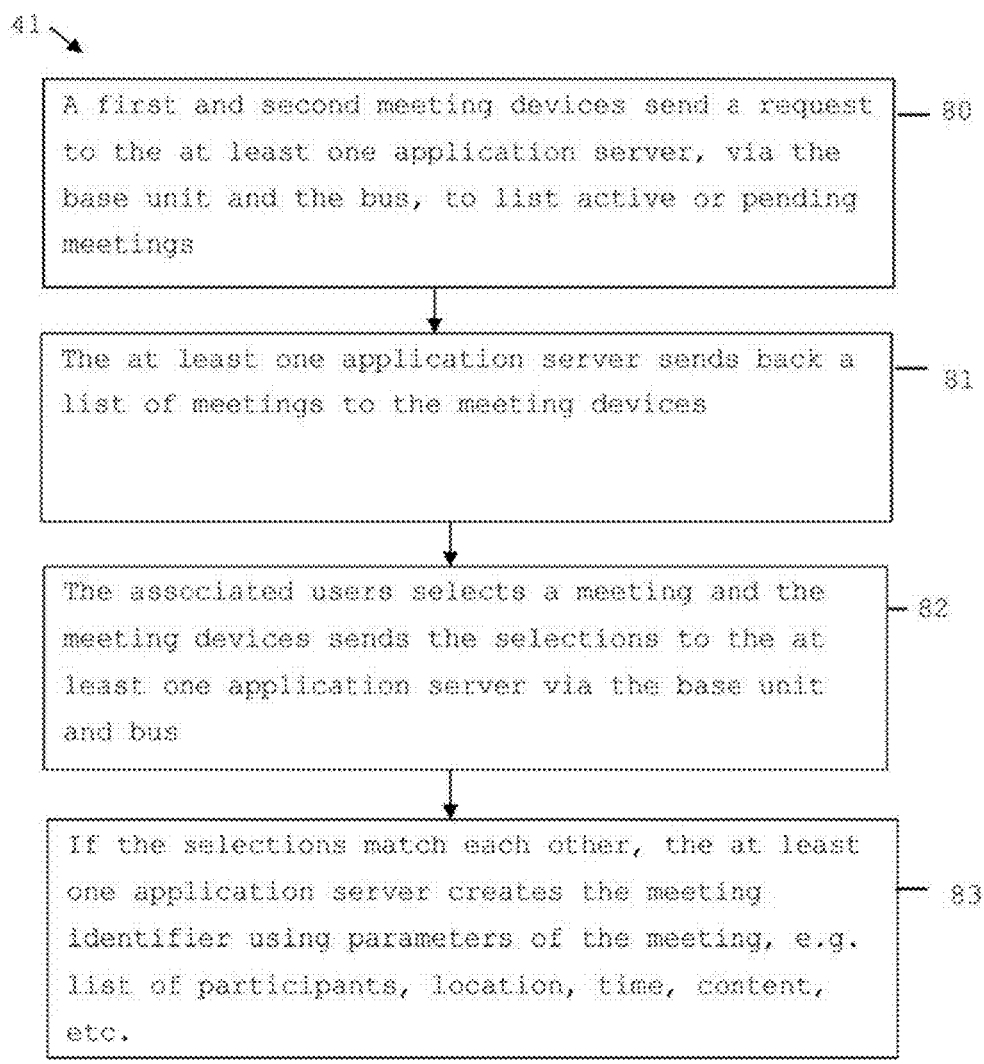
FIG. 8 shows a flow chart of an embodiment of the present invention where a meeting device initiates the creation of a meeting identifier.

FIG. 8 shows another embodiment of the present invention, where a meeting appointment exists in a calendar tool or the like. Such an appointment can be represented by parameters such as for example start time and/or duration, participants, location, content, and/or any other relevant information. These parameters can be used for creating the meeting identifier, for example using fuzzy logic.

Lists of relations between meeting participant meeting devices can be consulted, if needed. In step 80, a first and a second meeting device each send a request to the at least one application server to list active or pending meetings, possibly only those relevant to a user or an account. The request is sent to their respective base units which forward the requests to the at least one application server via the bus. In step 81 the application server sends a list of (relevant) meetings, if any, to the meeting devices, e.g. via the bus and the base units. A variation of steps 80 and 81 is where the request for list of relevant meetings is executed locally through a programmatic interface to a calendar application co-resident on the meeting device. In step 82, the users can select a meeting, and the selections are sent to the at least one application server via the base units and the bus. In step 83, the at least one application server receives the selections and it checks whether they match, i.e. that they have chosen the same meeting. Then the at least one application server creates the meeting identifier, using parameters of the meeting.

The procedure in FIG. 8 will be the same for all participants that are already planned in the meeting. If an ad-hoc participant wants to connect, he can be presented a name of the meeting, as described in FIG. 7. This can e.g. be communicated by a user already in the meeting. Alternatively it could be allowed to retrieve a list of meetings from the at least one application server. A relevant meeting name can be chosen so that the meeting is easy to identify. The underlying meeting identifier will however be that which is already created.

Figure 9:
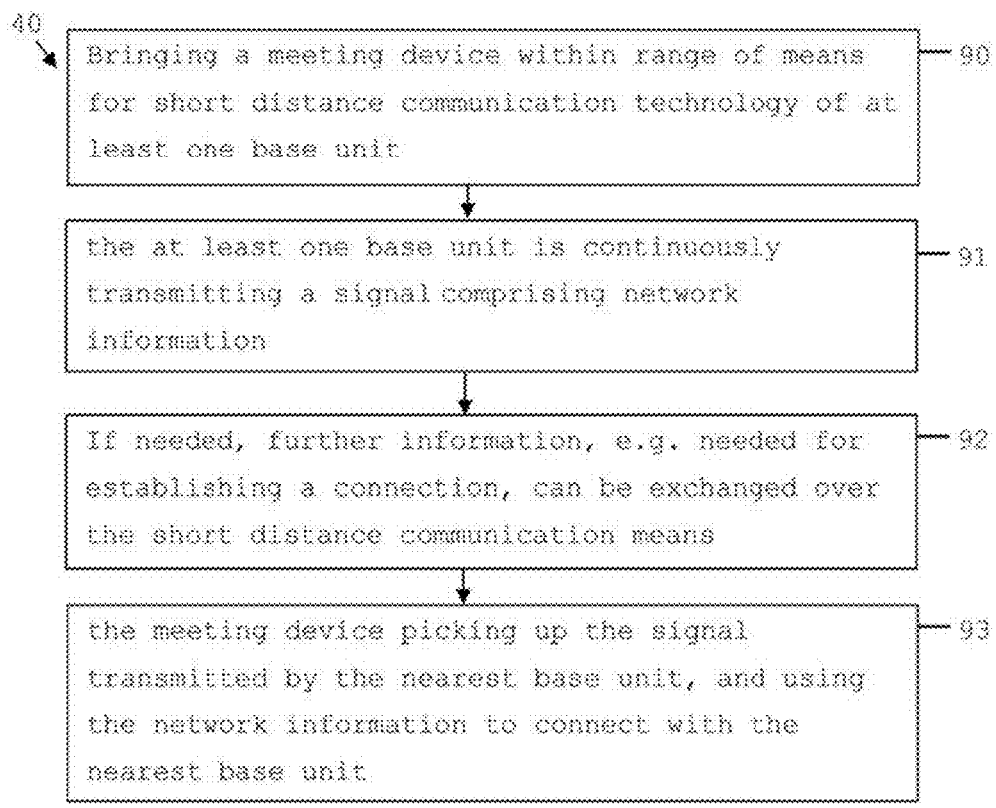
FIG. 9 shows a flow chart of an embodiment of the present invention where a meeting device connects with a base unit using short distance communication.

By using location aware technology especially indoor localisation schemes, like beacons, the base unit and meeting device can automatically establish connection when the meeting device enters the range of the base unit beacons. For example, the user does not have to engage scanning of available base units, nor does he have to select which unit to connect to. This is further described in FIG. 9 and FIG. 1 where the meeting device 1 and the base unit 3 are equipped with beacons 9 and 11 respectively. A short distance communication technology can be used, e.g. Bluetooth, Bluetooth Low Energy or Near Field Communication, or the like. Beacons can be used for example as part of an Indoor Positioning or Location System. In FIG. 9 step 90, a meeting device is brought in range of means for short distance communication technology of at least one base unit, i.e. a base unit broadcasting signals in a short distance communication channel. The use of a short distance communication technology prevents that a meeting device could pick up a signal when outside the location where the meeting is to be held, i.e. it prevents "eavesdropping". In step 91, the at least one base unit is intermittently or continuously transmitting a signal comprising network information. The intermittent signal can reduce power consumption, reduce the injection of interference energy into the wireless environment but should have a high rate. If needed, in step 92, further information can be exchanged over the short distance communication channel. This could be e.g. in case the connection information being continuously broadcasted is not complete or where an intermittent signal is used. The short distance communication signal (e.g. 21 and 22 in FIG. 1) comprises information for setting up connection, while the actual data streams with meeting content etc., to be shared, are sent over the local network (e.g. 19 or 20 in FIG. 1).

Figure 10A:
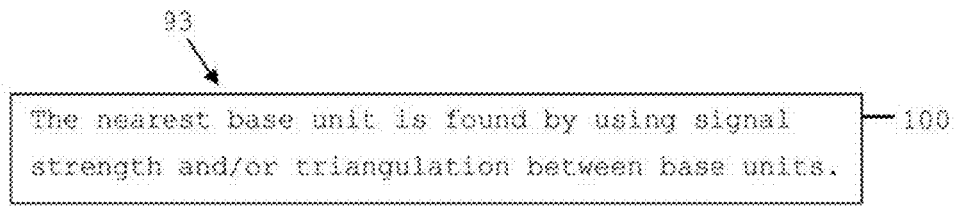
FIG. 10A and FIG. 10B illustrate an embodiment of the present invention where the nearest base unit is detected.
Figure 10B:
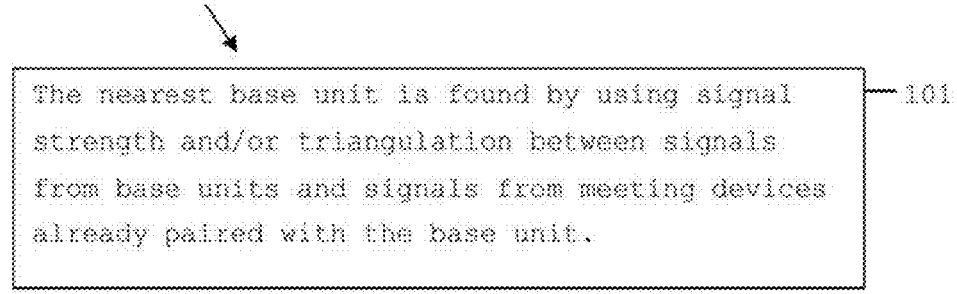

FIG. 10A shows an embodiment of the present invention where the step 93 of finding the nearest base unit is implemented by using signal strength and/or triangulation between the base units (shown as step 100). It is also possible to let already connected meeting devices act as additional beacons, shown in FIG. 10B in step 101. They would further increase the presence indication of the specific base unit they are connected to.

The last step in the flow chart of FIG. 4 comprises a base unit receiving the configured data stream. In one embodiment, the base unit can then push the data stream to a display in the meeting room. In another embodiment described in FIG. 11, the base unit can also push the stream to its meeting devices over the local network in step 102.

FIG. 12A shows a time diagram of an embodiment of the present invention that is related to the method described in FIG. 4. Meeting room A comprises base unit 3 and meeting device 1 and meeting room B comprises base unit 6 and meeting device 4. The meeting devices 1 and 4 are paired with their base units 3 and 6 respectively. The diagram has a time axis 124 where time increases in the direction of the arrow. The user in meeting room A makes the meeting device initiate the creation of a meeting identifier by e.g. clicking a button or similar associated with the meeting device. A signal 110 is sent to the base unit 3, which forwards the signal 111 to application server 8 using the bus 7, see FIG. 12B. The signal 111 arrives at the application server 8 at time t1, which is the start of a window of a pre-defined duration, for example 30 seconds. The time t1 is sent to the application server. The users of the meeting devices 1 and 4 have agreed (via a parallel communication channel, e.g. a phone call) that they would like to create a new meeting. Therefore, within a short time period, both meeting devices are initiating the creation of a meeting identifier. A signal 112 is sent to the base unit 6 which forwards the signal 113 to the bus 7. The signal 113 arrives at the bus 7 at time t2. The time t2 is sent to the application server. The application server now sends out notifications 114 and 116 to meeting devices 4 and 1 respectively, via base units 3 and 6 respectively. Base units 3 and 6 send the notifications 115 and 117, respectively, to the meeting devices 1 and 4, respectively, via the bus and the application server(s). Meeting devices 1 and 4 receives the notifications and selects the meeting devices 4 and 1, respectively. The selection notifications are sent back to the application server, via the base units 3 and 6. The application server checks if the difference between t1 and t2 is equal to- or less than the pre-defined value, for example 30 seconds. If this is the case, the application server creates the meeting identifier and sends it to the base units involved, via the bus. This meeting identifier can be presented in the user interface as an "illustrative" meeting name for any additional user, who wishes to connect according to the procedure in FIG. 7.

Note that in FIG. 12A, the networks 19 and 23 are separated from network 27. In one embodiment networks 19 and 23 are local, for example, they can be each a branch of an enterprise network, while network 27 is a global network, for example it could be the public internet or a leased line.

FIG. 13 shows a schematic of an exemplary embodiment of the present invention where the system has been scaled up to comprise a plurality of instances of the server supported entities. The dotted line 17 indicates the boundary of the cloud. Only one instance of each entity is numbered. There are three control servers 130-132, each with three instances. There are three application servers 133-135 comprising three instances each. The bus 7 has three instances. There are three base units 3, 6 and 136. 140-141 are six instances of a media server, drawn in two groups of three that reside at two cloud locations. 29 is a remotely connected meeting device. The device 29 emulates the functions of a base unit and communicates directly with the bus. For example, the meeting device 29 may be a mobile telephone having a first unit that carries out the base unit function, e.g. baseband processing, Digital to Analog conversion, front end, power amplifier and antenna. The phone also has a second unit having microprocessor, input means such as a keyboard or touchscreen, a display, various internal devices such as an accelerometer. With such a phone, the second unit can act as the meeting device and sends request internally to the first unit which then communicates directly with the bus.

The bus 7 is in fact implemented as a number of instances behind a load balancer. In one embodiment the system can be scaled up to handle hundreds of thousands of base units.

The communication with the bus takes place using secure websocket connections 142 (only three base units are illustrated) so that a bidirectional secure communication channel can be established. Secure websocket connections allow secure traversal of content across boundaries between the (local area) network of the base unit and the (global) cloud network of the media service.

Figure 14:
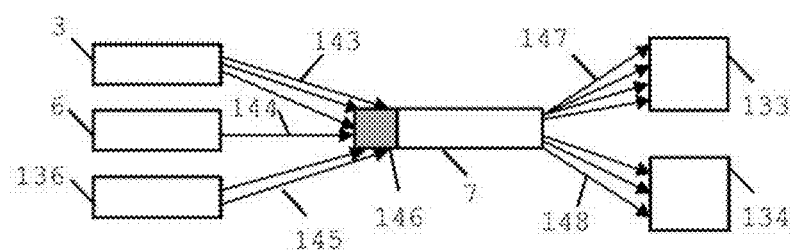
FIG. 14 illustrates schematic an embodiment of the present invention where base units are posting messages to the bus queue.

FIG. 14 shows schematics of an embodiment of the present invention. The base units 3, 6 and 136 receive signaling messages from meeting devices (not shown) on a local network, and post these signaling messages on the bus 7 via a load balancer 146. Base unit 3 sends three messages 143 and base unit 6 sends one message 144, and base unit 136 sends two messages 145. Each message will be queued on the bus until a subscriber picks it up. The application servers 133 and 134 are subscribers that listen to the bus. The control service manages the queue so that the application servers receive an equally distributed load. Application server 133 receives a group of four messages 147, and application server 134 receives a group of messages 148.

Figure 15:
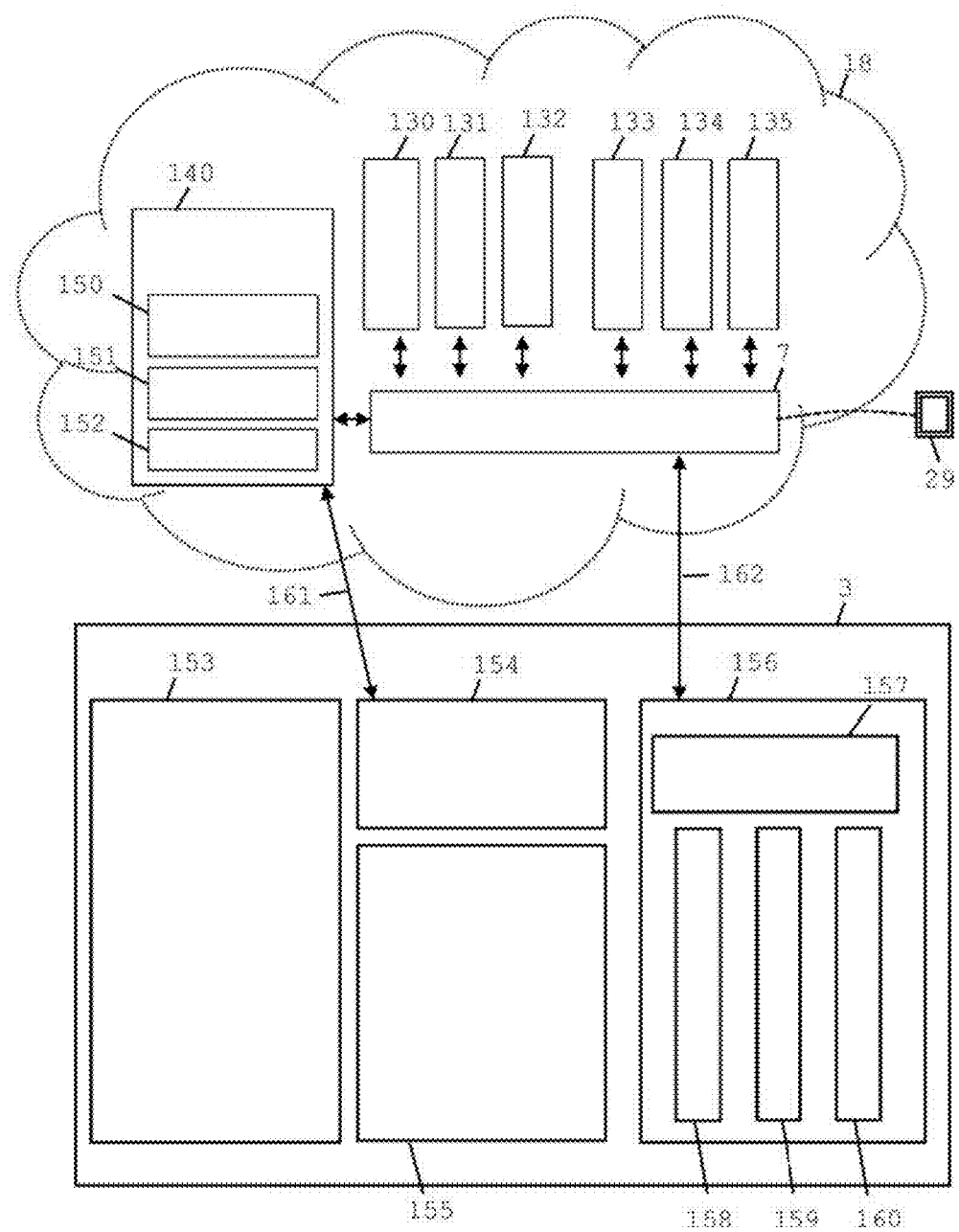
FIG. 15 illustrates schematic an embodiment of the present invention where a base unit and a remote device communicate with the cloud.

FIG. 15 shows a schematic of an embodiment of the present invention further illustrating the communication between a base unit 3 and the cloud 18. The servers in the cloud can be instances of virtual servers, providing functions which are referred to as services. The cloud can further comprise multiple cloud providers and multiple data centres.

The cloud comprises a media server 140 with media services 150 for performing e.g. composition or transcoding, a media library 151 and a secure websocket server 152. A library is an implementation of the specific protocol in use in the communication between the base unit and the cloud servers. The cloud further comprises a bus 7 which communicates with the control servers 130-132 and with the application services 133-135.

The base unit 3 comprise base unit logic 153, a secure websocket service 154 and a media library 155. The media server 140 and the media library 155 can run on the same protocol. The base unit 3 further comprises a signalling library 156, having a bus client 157 that connects to the bus 7 via a websocket connection 162. The bus client 157 and the application clients 158-160 implement the bus application programming interfaces.

By using the secure websockets it is possible to set up a bidirectional channel 161 where data streams can be tunnelled in a secure manner; 161 can comprise a multiple of channels. Note that 161 does not connect to the bus. 162 is a websocket connection between the signalling library 156 and the bus 7.

For a remote meeting device 29 the corresponding services of a physical base unit are implemented within the meeting device so that it communicates directly with the bus 7.

The invention claimed is:

1. A method for sharing data streams between meeting devices in a meeting in which the following are participating: at least two meeting devices adapted for electronic digital communication, at least two base units, at least one server, at least three communication networks, the method comprising the steps of:
the at least two meeting devices each connecting for electronic digital communication to a different base unit over at least two different networks,
at least one meeting device initiating the creation of a meeting identifier, each meeting identifier being shared, over a third network, with the at least two base units belonging to a meeting associated with the meeting identifier,
at least one of the at least two meeting devices sending at least one data stream to a first base unit with which it is connected, over one of the at least three communication networks or within the at least one meeting device, and
the first base unit and the at least one server exchanging set-up messages associated with the meeting identifier and the at least one data stream, via a service bus, and sending data streams between the at least two meeting devices according to the set-up messages, wherein the data streams are not communicated via the service bus.

2. A method according to claim 1 wherein the at least two base units are located in different rooms or different buildings or different countries or different continents, or in any combination thereof.

3. A method according to claim 1 wherein setup messages from the at least two base units are being posted to a service bus queue.

4. A method according to claim 1 wherein the at least one server comprises a media service and a control service, and the control service is instructing the media service how to manipulate the at least one data stream.

5. A method according to claim 4 wherein the media service comprises a method to combine a plurality of data streams into a single data stream based on instructions from the control service.

6. A method according to claim 4 comprising a set of instructions that can natively be executed by a web browser.

7. A method according to claim 1 wherein one of the at least two meeting devices and at least one of the two base units are integrated into one device.

8. A method according to claim 1 wherein the at least one server uses audio signals to uniquely pair initiation signals and creating the meeting identifier.

9. A method according to claim 8 wherein the audio signal comprises ambient sound at the locations of the respective meeting devices.

10. A method according to claim 1 wherein the system comprises a means for short distance communication, and one of the at least two meeting devices is being placed within range of the means for short distance communication technology of at least one base unit the at least one base unit is continuously transmitting a signal comprising network information the one of the at least two meeting devices picking up the signal transmitted by a nearest base unit, and using the network information to connect with the nearest base unit.

11. A method according to claim 10 wherein further connection information is exchanged over the means for short distance communication the one of the at least two meeting devices and the base unit using said connection information to connect.

12. A method according to claim 10 wherein the nearest base unit is selected by one of using signal strength and/or triangulation between base units, and using signal strength and/or triangulation between signals from base units and signals from meeting devices already paired with the base unit.

13. A method according to claim 10 wherein short distance communication is implemented using Bluetooth or Bluetooth Low Energy or Near Field Communication.

14. A method according to claim 1 wherein the each base unit is providing a shared stream to its at least one meeting device.

15. A method according to claim 1 wherein a base unit communicates with the service bus via secure websockets.

16. A method according to claim 1 wherein a meeting device is a laptop or a tablet or a mobile phone or a smartphone or a palm pad or a stationary computer.

17. A method according to claim 1 wherein a base unit is a collaboration platform communicating with meeting devices over the first network and communicating with the at least one server, using the service bus, over the second network.

18. A system for sharing data streams between meeting devices, the system comprising at least two meeting devices, at least two base units, at least one server, a service bus, hosted by the at least one server, a meeting identifier, at least two local networks separated from a global network, the at least two meeting devices being each connected to a different base unit over the at least one local network, the at least two base units being connected to the service bus over the global network and, wherein base units belonging to the same meeting share one meeting identifier,
  wherein a function of the base unit is implemented as a computer program product comprising a machine-readable medium carrying instructions which, when executed by a processor, cause the processor to perform the method of claim 1.

19. A method for sharing data streams between meeting devices in a meeting in which the following are participating: at least two meeting devices adapted for electronic digital communication, at least two base units, at least one server, at least three communication networks, the method comprising the steps of the at least two meeting devices each connecting for electronic digital communication to a different base unit over at least two different networks, at least one meeting device initiating the creation of a meeting identifier, each meeting identifier being shared, over a third network, with the at least two base units belonging to a meeting associated with the meeting identifier, at least one of the at least two meeting devices sending at least one data stream to a first base unit with which it is connected, over one of the at least three communication networks or within the at least one meeting device, and the first base unit and the at least one server exchanging set-up messages associated with the meeting identifier and the at least one data stream, via a bus,
  wherein the initiating of the creation of a meeting identifier is selected from one of the following method flows:
  a first meeting device sending an initiation signal to the first base unit, the first base unit sending the signal to the at least one server via the bus, the signal arriving at the at least one server at a first time (t1), a second meeting device sending an initiation signal to a second base unit, the second base unit sending the signal to the at least one server via the bus, the signal arriving at the at least one server at a second time (t2), and if the difference between the second and first time (t2−t1) is less than or equal to a predefined value, the at least one server sends out notifications of the first and second meeting devices to the second and first meeting devices, respectively, the first and second meeting devices selecting the second and first meeting device, respectively, and when the selections are received by the at least one server, the at least one server is creating a meeting identifier, or
  a first meeting device sending a request to the at least one server, via the first base unit and the bus, to list active or pending meetings, if there are meetings associated with the first meeting device, the at least one server sending back a list of meetings to the first meeting device a second meeting device sending a request to the at least one server, via a second base unit and the bus, to list active or pending meetings, if there are meetings associated with the second meeting device, the at least one server sending back a list of meetings to the second meeting device selecting a meeting by associated users and the first and second meeting devices sending the selections to the at least one server via the first and second base units and the bus and when the selections are matching each other and are received by the at least one server, the at least one server is creating a meeting identifier, or
  a first meeting device sending an initiation signal to the first base unit by entering a pre-defined token, the first base unit sending the token to the at least one server via the bus, a second meeting device sending an initiation signal to a second base unit by entering the above pre-defined token, the second base unit sending the token to the at least one server via the bus, the at least one application server defining the predefined token as the meeting identifier, or
  a first meeting device sending an initiation signal to the first base unit when a first button is pressed, the first base unit sending the signal to the at least one server via the bus, a second meeting device sending an initiation signal to a second base unit when a second button is pressed while the first button is still being pressed, the second base unit sending the signal to the at least one server via the bus, the at least one server sending out notifications of the first and second meeting devices to the second and first meeting devices, respectively, the first and second meeting devices selecting the second and first meeting devices, respectively, and when the selections are received by the at least one server, the at least one server creating a meeting identifier.

20. A method according to claim 19 wherein sending an initiation signal comprises a user action selected from changing orientation of the meeting device or shaking the meeting device or pushing a physical or virtual knob or button associated with the meeting device.

21. A method according to claim 20 further comprising an external communication channel of ambient audio signals associated with the at least two meeting devices and the ambient audio signals from each of meeting device location being sent along with the initiation signal to the at least one server from the first and second base units and via the external communication channel, if the audio signals from the first and second base units that travelled via the external communication channel match with the audio signals sent directly by the first and second base units, the at least one server creating a meeting identifier for matching signals.

22. A method according to claim 19 wherein the list of pending meetings is created locally on the first and second meeting devices via a local calendar application.

23. A system for sharing data streams between meeting devices, the system comprising:
  at least two meeting devices,
  at least two base units,
  at least one server,
  a service bus, hosted by the at least one server,
  a meeting identifier,
  at least two local networks separated from a global network,
  the at least two meeting devices being each connected to a different base unit over the at least one local network,
  the at least two base units being connected to the service bus over the global network, wherein at least one of the at least two meeting devices is configured to initiate the creation of the meeting identifier, the meeting identifier being shared, over the global network, with the at least two base units, wherein at least one of the at least two meeting devices is configured to send at least one data stream to a first base unit with which the at least one meeting device is connected, wherein the first base unit and the at least one server are configured to exchange set-up messages associated with the meeting identifier and the at least one data stream, via the service bus, wherein the at least one of the at least two meeting devices is configured to send the at least one data stream according to the set-up messages, wherein the data stream is not communicated via the service bus, and, wherein base units belonging to the same meeting share one meeting identifier.

24. A system according to claim 23 wherein set-up messages from the at least two base units to the at least one server are posted to a service bus queue.

25. A system according to claim 24 wherein a base unit is connected to an input device, for example a physical button or an emulated button.

* * * * *